United States Patent
Frost et al.

(10) Patent No.: US 9,660,278 B2
(45) Date of Patent: May 23, 2017

(54) METHOD FOR DETECTING ORIFICE FLOW PHASE TRANSITION IN A PRESSURE-CONTROLLED ANODE

(75) Inventors: Patrick Frost, Tucson, AZ (US); Daniel C. Di Fiore, Scottsburg, NY (US); Ralf Senner, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 2163 days.

(21) Appl. No.: 12/711,144

(22) Filed: Feb. 23, 2010

(65) Prior Publication Data
US 2011/0207012 A1  Aug. 25, 2011

(51) Int. Cl.
- $H01M\ 8/04$ (2016.01)
- $H01M\ 8/04119$ (2016.01)
- $H01M\ 8/04828$ (2016.01)
- $H01M\ 8/04089$ (2016.01)
- $H01M\ 8/1018$ (2016.01)

(52) U.S. Cl.
CPC ... *H01M 8/04164* (2013.01); *H01M 8/04843* (2013.01); *H01M 8/04097* (2013.01); *H01M 2008/1095* (2013.01)

(58) Field of Classification Search
None
See application file for complete search history.

(56) References Cited

U.S. PATENT DOCUMENTS

2003/0190502 A1\* 10/2003 Illner et al. .............. 429/13
2007/0196709 A1\* 8/2007 Umayahara et al. .......... 429/25

\* cited by examiner

*Primary Examiner* — Barbara Gilliam
*Assistant Examiner* — Stephan Essex
(74) *Attorney, Agent, or Firm* — John A. Miller; Miller IP Group, PLC

(57) ABSTRACT

A fuel cell system that determines the phase transition from water to gas through a bleed/drain valve in a water separation device. The fuel cell system includes a fuel cell stack having an anode side and a cathode side. An injector injects hydrogen gas into the anode side of the fuel cell stack. The water separation device receives an anode exhaust gas from the anode side of the fuel cell stack, where the water separation device includes a water holding reservoir. A controller controls the injector and the bleed/drain valve and determines when the bleed/drain valve transitions from draining water to bleeding the anode exhaust gas by comparing the flow rate through the water separation device and the flow rate through the injector.

12 Claims, 1 Drawing Sheet

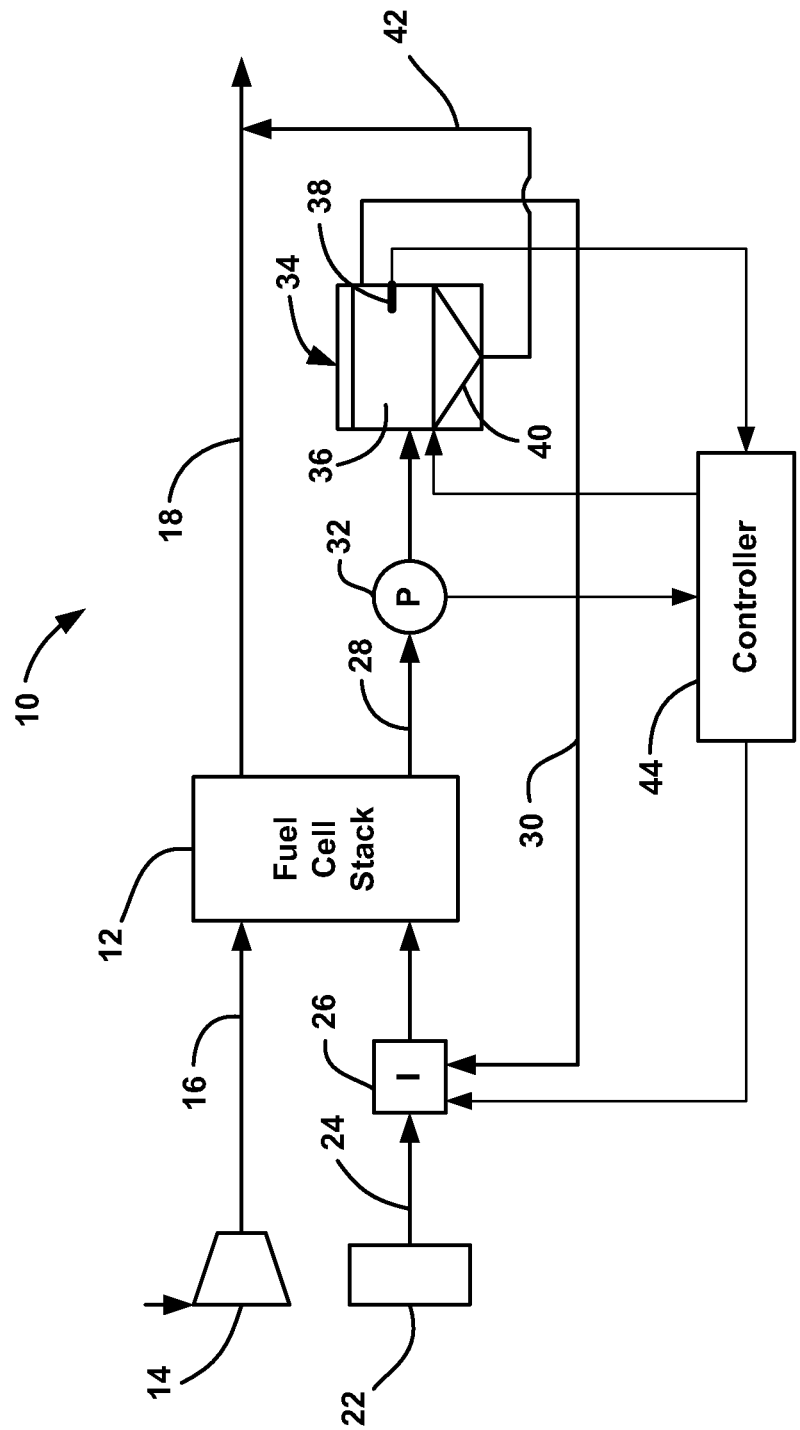

METHOD FOR DETECTING ORIFICE FLOW
PHASE TRANSITION IN A
PRESSURE-CONTROLLED ANODE

BACKGROUND OF THE INVENTION

1. Field of the Invention

This invention relates generally to a system and method for detecting a phase change from liquid to gas and, more particularly, to a system and method for detecting a phase change from liquid to gas through an anode recirculation bleed/drain valve so that an anode bleed model knows the amount of nitrogen that is being bled from the anode side of a fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It is desirable that the distribution of hydrogen within the anode flow channels in the fuel cell stack be substantially constant for proper fuel cell stack operation. Therefore, it is known in the art to input more hydrogen into the fuel cell stack than is necessary for a certain output load of the stack so that the anode gas is evenly distributed. However, because of this requirement, the amount of hydrogen in the anode exhaust gas is significant, and would lead to low system efficiency if that hydrogen were discarded. Further, hydrogen gas in a sufficient quantity discharged to the environment could cause certain problems because of the combustible nature of hydrogen. Therefore, it is known in the art to recirculate the anode exhaust gas back to the anode input to reuse the discharged hydrogen.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode gas output of the fuel cell stack to remove nitrogen from the anode side of the stack.

Models are typically used to calculate the concentration of nitrogen in the anode side of the fuel cell stack based on the operating parameters of the fuel cell system, such as stack current density, system pressure, etc.

As mentioned above, water is a by-product of the fuel cell stack operation. Water is forced out of the anode flow channels by gas flowing therethrough. The water expelled from a fuel cell stack is typically collected in a holding tank in a water separating device in the anode exhaust flow system. A water level indicator provided in the water separator device indicates when the tank is full and a drain valve is subsequently open to drain the tank to the environment.

It has recently been proposed in the art to reduce the complexity of a fuel cell system by combining an anode bleed valve and an anode drain valve into a single valve to perform both the bleed and drain functions discussed above. This combined drain and bleed valve has been proposed to be located in the water separation device at the bottom of the holding tank. However, when a bleed is commanded to remove nitrogen from the anode side of the stack, water in the holding tank must first be removed before gas in the anode exhaust can flow through the valve in the water separation device. In order for the model that determines the amount of nitrogen in the anode side of the fuel cell stack to be accurate, it needs to know the phase transition from when the bleed/drain valve is draining water to when it is bleeding gas so that the model knows that nitrogen is being removed from the anode side of the stack.

SUMMARY OF THE INVENTION

In accordance with the teachings of the present invention, a fuel cell system is disclosed that determines the phase transition from water to gas through a bleed/drain valve in a water separation device. The fuel cell system includes a fuel cell stack having an anode side and a cathode side. An injector injects hydrogen gas into the anode side of the fuel cell stack. The water separation device receives an anode exhaust gas from the anode side of the fuel cell stack, where the water separation device includes a water holding reservoir. A controller controls the injector and the bleed/drain valve and determines when the bleed/drain valve transitions from draining water to bleeding the anode exhaust gas by comparing the flow rate through the water separation device and the flow rate through the injector.

Additional features of the present invention will become apparent from the following description and appended claims, taken in conjunction with the accompanying drawings.

BRIEF DESCRIPTION OF THE DRAWING

FIG. 1 is a schematic plan view of a fuel cell system employing a water separation device having a bleed/drain valve.

DETAILED DESCRIPTION OF THE EMBODIMENTS

The following discussion of the embodiments of the invention directed to a system and method for determining the phase transition from liquid to gas through a bleed/drain valve in an anode exhaust system is merely exemplary in nature, and is in no way intended to limit the invention or its applications or uses. For example, the present invention has particular application for determining the phase transition from liquid to gas through a bleed/drain valve in an anode recirculation system of a fuel cell system. However, as will be appreciated by those skilled in the art, the present invention will have application for determining the phase transition from liquid to gas for other types of systems other than fuel cell systems and other types of fuel cell systems other than anode recirculation systems, such as anode flow shifting systems.

FIG. 1 is a schematic plan view of a fuel cell system 10 including a fuel cell stack 12 having a cathode side and an anode side. The fuel cell system 10 includes a compressor 14 that provides cathode air to the cathode side of the fuel cell stack 12 on a cathode input line 16 where cathode output gas is output from the fuel cell stack 12 on a cathode output line 18. The fuel cell system 10 also includes a hydrogen gas source 22 that provides hydrogen gas on an anode input line 24 that is injected into the anode side of the fuel cell stack 12 by an injector 26. The injector 26 can be any injector, or bank of injectors, suitable for the purposes described herein.

In this embodiment, the fuel cell system 10 employs anode recirculation where an anode recirculation gas output on an anode exhaust gas line 28 is recirculated back to the anode input by an anode recirculation line 30 through the injector 26 so as to conserve the hydrogen gas being discharged from the stack 12. A pressure sensor 32 measures the pressure in the anode output line 28.

As discussed above, water is a by-product of the operation of the fuel cell stack 12. In order to remove the water from the recirculated anode gas so it is not sent back to the anode input, a water separation device 34 is provided in the anode recirculation line 30. The water separation device 34 includes a reservoir or tank 36 that holds the water collected by the water separator device 34 in a manner well understood to those skilled in the art. A water level indicator 38 provides an indication of the water level in the reservoir 34 so that the system 10 knows when to drain the reservoir 36. The water separation device 36 also includes a bleed/drain valve 40 located at the bottom of the reservoir 36 that operates to both drain the reservoir 36 and bleed nitrogen from the recirculated anode gas. In this embodiment, the bled gas and water is sent on line 42 to be mixed with the cathode exhaust gas in the line 18 so that hydrogen within the bled exhaust gas is diluted to be well below the combustible level. A controller 44 controls the operation of the injector 26 and the valve 40, and receives signals from the water level indicator 38 and the pressure sensor 32.

As mentioned above, a model is typically used to calculate how much nitrogen is in the anode side of the fuel cell stack 12 to determine when to perform an anode bleed through the bleed/drain valve 40. In order to provide an accurate determination of the nitrogen in the anode side of the fuel cell stack 12, the model needs to know how much nitrogen or gas is being bled through the bleed/drain valve 40 for both a system bleed request and a system drain request. When the bleed/drain valve 40 is opened for the bleed or drain request, water will typically flow first through the valve 40, and at some point thereafter when the reservoir 36 is empty, gas will begin to flow through the valve 40. Typically, there is minimal two-phase flow through the valve 40 in that the transition from the water flow to the gas flow is well defined and abrupt. Once the model knows when the gas flow through the valve 40 starts, it can use various system parameters, such as valve orifice size, concentration of nitrogen, anode pressure, etc., to determine the amount of nitrogen that is being removed from the anode side of the fuel cell stack 12.

The present invention employs the fact that the water in the water separator device 34 acts as a pressure barrier in the valve 40 to determine when the water is completely drained from the reservoir 36 and gas begins to flow out of the valve 40. Particularly, when the valve 40 is opened and water is draining from the reservoir 36 through the valve 40, the pressure in the anode side of the stack 12 remains substantially constant as detected by the pressure sensor 32, where the duty cycle of the injector 26 will remain substantially constant. However, when gas begins flowing through the valve 40, the pressure in the anode side of the fuel cell stack 12 drops and the duty cycle of the injector 26 increases to increase the pressure in the anode side to maintain the level of hydrogen necessary for the commanded current density from the stack 12.

In one embodiment, the algorithm employed in the controller 44 looks at the flow rate through the anode flow system when the valve 40 is opened to determine that gas is flowing through the valve 40. In other words, for a particular stack current density when the valve 40 is open, a certain flow rate should be occurring and that flow rate is determined by the duty cycle of the injector 26. When that flow rate is within some threshold of the stored flow rate for the valve 40 being open, than the algorithm knows that gas is now flowing through the valve 40.

The analysis above can be defined by the equation:

$$\left( \frac{i \cdot AA \cdot Ncell}{2 \cdot F} + \dot{n}_{bleed} + \frac{\frac{dp}{dt} \cdot V_{An}}{R \cdot T} \right) - \dot{n}_{inj} < \text{Tolerance}$$

Where i is the current density of the stack 12, AA is the active area of a fuel cell in the stack 12, $N_{cell}$ is the number of fuel cells in the stack 12, F is Faradays constant, $\dot{n}_{bleed}$ is the predicted gas flow through the valve 40, P is the pressure in the anode, $V_{An}$ is the volume of the anode sub-system, R is a gas constant, T is temperature and $\dot{n}_{inj}$ is the injector flow rate.

The first term in the parenthesis in the equation is a feed-forward term to tell the algorithm where to start and the third term in the parenthesis is a flow bias term. The feed-forward term, the flow bias term and the predicted flow $\dot{n}_{bleed}$ through the valve are added to get an added flow value in the equation. The flow $\dot{n}_{inj}$ through the injector 26 is subtracted from the added value and compared to a tolerance value. If the subtracted value is less than the tolerance value, meaning that the flow through the injector 26 has increased because of the pressure drop in the anode flow system, then the algorithm knows that gas is now flowing through the valve 40. The algorithm can then use that flow to adjust the nitrogen concentration model in the stack 12.

Although power transients typically do not have an effect on the equation for determining the transition from water flow to gas flow, in an alternate embodiment, the flow bias term can be adjusted for up transients to make the algorithm more accurate.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including a cathode side and an anode side;
an injector for injecting hydrogen gas into the anode side of the fuel cell stack;
a water separation device receiving an anode exhaust gas from the anode side of the fuel cell stack, said water separation device including a water holding reservoir and a bleed/drain valve; and
a controller programmed to control the injector and the bleed/drain valve, said controller opening the bleed/drain valve in the water separation device and determining when the bleed/drain valve transitions from draining water to bleeding anode exhaust gas, wherein the controller uses the bleeding of the anode exhaust gas through the bleed/drain valve and the determination of when the bleed/drain valve transitions from draining water to bleeding anode exhaust gas in a nitrogen accumulation model such that the model determination of the amount of nitrogen in the anode side of the stack has increased accuracy, wherein the controller compares the flow rate through the water separation device and the flow rate through the injector to determine when the bleed/drain valve transitions from draining water to bleeding the anode exhaust gas.

2. The system according to claim 1 wherein the controller determines a water separation device flow rate value and compares it to an injector flow rate value where the water separation device flow rate value includes a feed-forward term, a flow bias term and a predicted flow term through the bleed/drain valve.

3. The system according to claim 2 wherein the controller subtracts the water separation device flow rate value and the injector flow rate value and compares the subtracted value to a threshold where if the subtracted value is below the threshold, the controller determines that the bleed/drain valve is bleeding gas.

4. The system according to claim 3 wherein the controller determines whether the bleed/drain valve has transitioned from draining water to bleeding gas according to the following equation:

$$\left( \frac{i \cdot AA \cdot Ncell}{2 \cdot F} + \dot{n}_{bleed} + \frac{\frac{dp}{dt} \cdot V_A n}{R \cdot T} \right) - \dot{n}_{inj} < \text{Tolerance}$$

where i is the current density of the stack, AA is the active area of a fuel cell in the stack, $N_{cell}$ is the number of fuel cells in the stack, F is Faradays constant, $\dot{n}_{blood}$ is the predicted gas flow through the valve, P is the pressure in the anode, $V_{An}$ is the volume of the anode subsystem, R is a gas constant, T is temperature and $\dot{n}_{inj}$ is the injector flow rate.

5. The system according to claim 1 wherein the controller determines stack up-power transients as part of the determination of the transition from draining water to bleeding gas.

6. The system according to claim 1 wherein the fuel cell system includes an anode recirculation line that recirculates anode exhaust gas from the water separation device to the injector.

7. A fuel cell system comprising:
a fuel cell stack including a cathode side and an anode side;
an injector for injecting hydrogen gas to the anode side of the fuel cell stack;
a recirculation line for recirculating anode exhaust gas from an anode output of the fuel cell stack to the injector;
a water separation device positioned in the recirculation line and receiving the anode exhaust gas from the anode output, said water separation device including a water holding reservoir and a bleed/drain valve; and
a controller programmed to control the injector and the bleed/drain valve, said controller comparing the flow rate through the water separation device and the flow rate through the injector to determine when the bleed/drain valve transitions from draining water to bleeding the anode exhaust gas, said controller using the bleeding of the anode exhaust gas in a nitrogen accumulation model.

8. The system according to claim 7 wherein the controller determines a water separation device flow rate value and compares it to an injector flow rate value where the water separation device flow rate value includes a feed-forward term, a flow bias term and a predicted flow term through the bleed/drain valve.

9. The system according to claim 8 wherein the controller subtracts the water separation device flow rate value and the injector flow rate value and compares the subtracted value to a threshold where if the subtracted value is below the threshold, the controller determines that the bleed/drain valve is bleeding gas.

10. The system according to claim 9 wherein the controller determines whether the bleed/drain valve has transitioned from draining water to bleeding gas according to the following equation:

$$\left( \frac{i \cdot AA \cdot Ncell}{2 \cdot F} + \dot{n}_{bleed} + \frac{\frac{dp}{dt} \cdot V_A n}{R \cdot T} \right) - \dot{n}_{inj} < \text{Tolerance}$$

where i is the current density of the stack, AA is the active area of a fuel cell in the stack, $N_{cell}$ is the number of fuel cells in the stack, F is Faradays constant, $\dot{n}_{blood}$ is the predicted gas flow through the valve, P is the pressure in the anode, $V_{An}$ is the volume of the anode subsystem, R is a gas constant, T is temperature and $\dot{n}_{inj}$ is the injector flow rate.

11. The system according to claim 7 wherein the controller determines stack up-power transients as part of the determination of the transition from draining water to bleeding gas.

12. The system according to claim 7 wherein the controller uses the bleeding of the anode exhaust gas through the bleed/drain valve and the determination of when the bleed/drain valve transitions from draining water to bleeding anode exhaust gas in a nitrogen accumulation model such that the model determination of the amount of nitrogen in the anode side of the stack has increased accuracy.

\* \* \* \* \*